United States Patent [19]

Ueyama et al.

[11] Patent Number: 5,095,256
[45] Date of Patent: Mar. 10, 1992

[54] DRIVE CIRCUIT FOR A PIEZOELECTRIC ACTUATOR

[75] Inventors: Shujiro Ueyama; Masaki Yukino; Hiroshi Kitayama, all of Tokyo, Japan

[73] Assignee: NEC Corporation, Tokyo, Japan

[21] Appl. No.: 442,758

[22] Filed: Nov. 29, 1989

[30] Foreign Application Priority Data

Nov. 29, 1988 [JP] Japan .................. 63-299468

[51] Int. Cl.$^5$ .......................................... H01L 41/08
[52] U.S. Cl. ...................... 318/116; 310/316; 346/78
[58] Field of Search ............... 318/116; 310/316, 317; 346/78, 140 R

[56] References Cited

U.S. PATENT DOCUMENTS

| | | | |
|---|---|---|---|
| 4,595,854 | 6/1986 | Yano et al. | 310/317 |
| 4,714,935 | 12/1987 | Yamamoto et al. | 310/317 X |
| 4,732,129 | 3/1988 | Takigawa et al. | 310/316 X |
| 4,767,959 | 8/1988 | Sakakibara et al. | 310/317 |
| 4,947,074 | 8/1990 | Suzuki | 310/316 |

Primary Examiner—Mark O. Budd
Attorney, Agent, or Firm—Sughrue, Mion, Zinn, Macpeak & Seas

[57] ABSTRACT

A drive circuit for driving a piezoelectric (PZ) stack, in response to an excitation voltage, generates a dimensional strain varying along a sinusoidal waveform in a PZ stack by applying an excitation voltage intermittently to a series connection of the PZ stack and a winding via a first switching circuit, and then releases the charge of the PZ stack intermittently via a second switching circuit. A control circuit controls the first and second switching circuits by generating a first and second drive pulse stream so that the charge voltage of the PZ stack returns to its initial state in a period of the first and second drive pulse streams. The charge stored in the PZ stack is released fully and quickly before the application of the next pulse voltage without the use of a resistor, and the resonance current which flows through the PZ stack is constant, thereby allowing the PZ stack to be fully discharged without requiring an exclusive path.

12 Claims, 5 Drawing Sheets a
DRIVE CIRCUIT FOR A PIEZOELECTRIC ACTUATOR

BACKGROUND OF THE INVENTION

The present invention relates to an improvement in a drive circuit for driving a piezoelectric (PZ) actuator comprised of a PZ stack.

A PZ actuator implemented by a PZ stack is often used with a dot matrix printer or an ink jet printer for driving a print head. A PZ stack generates, in response to an excitation voltage, a dimensional strain whose amplitude varies with time along a sinusoidal waveform. The dimensional strain is transmitted to a reciprocating mechanical object included in the print head, whereby a single dot is printed out. In the case of a dot matrix printer, the mechanical object is a print wire built in the print head while, in the case of an ink jet printer, it is a cell having a nozzle for jetting a drop of ink. The print head is constructed to print out one dot in response to every sinusoidal strain of the PZ stack. The PZ stack is so driven by a drive circuit as to generate adequate dimensional strains.

A prior art drive circuit includes a series connection of a PZ stack and a winding and applies an excitation voltage in the form of a rectangular pulse to the series connection every time one dot is to be printed out, as disclosed in U.S. Pat. No. 4,595,854. The PZ stack is charged by a resonance current which is caused to flow by the excitation voltage, whereby a dimensional strain proportional to the charge current is generated to cause a mechanical object into a reciprocating motion. A prerequisite with such a PZ stack is that the charge stored in the capacitance thereof be fully released before the application of the next printing pulse voltage. Otherwise, the residual charge would effect the intensity of a strain for printing out the next dot resulting in an uneven image density distribution. In the prior art drive circuit, however, the resonance current which flows through the PZ stack varies because the dot-by-dot strain of the PZ stack and the reaction of the mechanical object acting on the PZ stack are not constant, allowing residual charge to occur. It has been customary to provide the drive circuit with an exclusive discharging path so that after the application of an excitation voltage the residual charge may be dissipated through the resistance of the exclusive path. A problem with this approach is that the resistance consumes the current flowing during the charge dissipation as thermal energy, i.e., the residual charge is simply wasted to degrade the efficiency. Moreover, an extra period of time for discharging the residual charge is needed every time one dot is printed out, thus slowing down the printing operation. Another problem is that the winding has to have an inductance great enough to insure the resonance of the drive circuit, resulting in the need for a winding having a substantial size. For example, assuming a PZ stack made of ceramic whose proper oscillation frequency is about 3000 hertz, a resonance frequency of 3000 hertz which matches the proper oscillation frequency is needed. Since a PZ stack usually has a capacitance of about 0.3 microfarads, the resonance frequency of 3000 hertz mentioned above is not attainable without resorting to a winding having an inductance of 5 microhenries to 10 microhenries and, therefore, a large-size winding.

SUMMARY OF THE INVENTION

It is therefore an object of the present invention to provide a PZ stack drive circuit which achieves high efficiency by eliminating wasteful consumption of energy.

It is another object of the present invention to provide a PZ stack drive circuit which does not need the dissipation of charge after the print-out of a dot.

It is another object of the present invention to provide a drive circuit which reduces the required inductance of a winding which is connected in series with a PZ stack.

A drive circuit for driving a PZ stack which is connected to a reciprocating mechanical object, generates a dimensional strain in response to an excitation voltage, and imparts the strain to the mechanical object to cause the object into a reciprocating motion, comprises a winding connected in series with the PZ stack, a first switching circuit for switching the supply of the excitation voltage intermittently and for feeding it to a series connection of the winding and the PZ stack in response to a first drive pulse stream a pulse width of which varies with time, a second switching circuit for switching the series connection of the winding and a terminal of the PZ stack to the ground intermittently and for discharging a charge stored in the PZ stack intermittently via the winding in response to a second drive pulse stream which appears immediately after the first drive pulse stream and has a pulse width which varies with time, and a control circuit for controlling the first and second switching means by generating the first and second drive pulse streams such that a charged voltage of the PZ stack returns to an initial state in a period of the first and second drive pulse therefor streams.

The present invention provides a PZ stack drive circuit which generates a dimensional strain varying along a sinusoidal waveform in a PZ stack by applying an excitation voltage intermittently to the series connection of the PZ stack and a winding via a first switching circuit and then releasing the charge of the PZ stack intermittently via a second switching circuit. The drive circuit, therefore, insures efficient and stable charging and discharging of the PZ stack and eliminates wasteful consumption of energy. The drive circuit is miniaturized because the required inductance of the winding is reduced. It is noteworthy that the control circuit which is a characteristic feature of the present invention can be readily implemented as an LSI and, therefore, does not increase the circuit scale at all.

BRIEF DESCRIPTION OF THE DRAWINGS

The present invention will be better understood from the following detailed description taken in conjunction with the accompanying drawings in which.

DESCRIPTION OF THE PREFERRED EMBODIMENT

Figure 1:
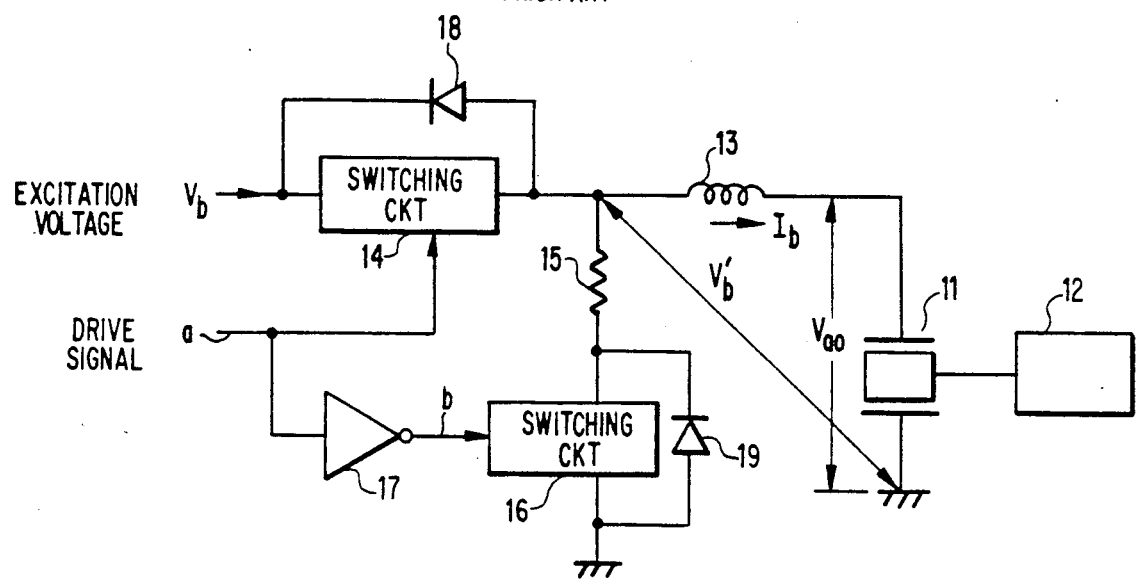
FIG. 1 is a schematic block diagram showing a prior art PZ stack drive circuit.
Figure 2:
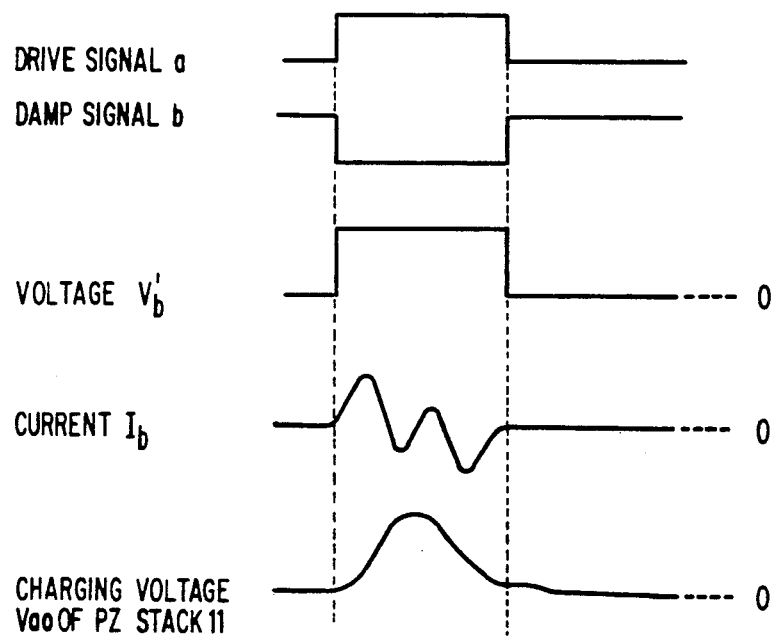
FIG. 2 is a timing chart useful for understanding the operation of the drive circuit shown in FIG. 1.

To facilitate the understanding of the present invention, a brief reference will be made to a prior art PZ stack drive circuit which is disclosed in U.S. Pat. No. 4,595,854 referred to as prior art previously, shown in FIGS. 1 and 2. As shown, the prior art drive circuit has a winding 13 connected in series with a PZ stack 11, a switching circuit 14 for applying an excitation voltage $V_b$, and a switching circuit 16. The PZ stack 11 is mechanically connected to a reciprocating mechanical object 12 which is included in a print head of a printer, whereby dimensional strains of the PZ stack 11 are imparted to the object 12. The PZ stack is connected at one electrode thereof to the winding 13 and at the other electrode to ground. The winding 13 is connected to the switching circuit 14 and, via a resistor 15, to the switching circuit 16. The excitation voltage $V_b$ is constantly applied to the switching circuit 14. When a switch drive signal a also applied to the switching circuit 14 is in a high level, the switching circuit 14 is turned on to feed the excitation voltage $V_b$ to the series connection of winding 13 and PZ stack 11 as a rectangular pulse. Then, a resonance current $I_b$ having positive and negative polarities as shown in FIG. 2 flows through the coil 13 and PZ stack 11 to charge the PZ stack 11. As a result, the PZ stack 11 generates a dimensional strain proportional to a voltage $V_{aO}$ charged therein. An inverter 17 inverts the drive voltage a to feed a damp signal b to the switching circuit 16. The signal b turns on the switching circuit 16 so as to release residual charge from the PZ stack 11 via the winding 13 and a resistor 15, as will be described in detail later.

While the drive signal a is in a high level, the dimensional strain of the PZ stack 11 is imparted to the mechanical object 12 to print out one dot. At this instant, the resonance current $I_b$ fluctuates for every dot printing operation because the dimensional strain of the PZ stack 11 and the reaction of the mechanical object 12 acting on the PZ stack 11 are not constant for every dot printing operation. The charged voltage $V_{aO}$, therefore, does not become zero due to the residual charge. If the next drive signal is fed for printing out another dot with the residual charge being held in the PZ stack 11, the movement of the object 12 will become irregular resulting in images being printed out in an uneven density distribution. To terminate such a movement of the object 12, it is necessary to discharge the residual charge in the PZ stack 11. In light of this, the drive circuit shown in FIG. 1 turns on the switching circuit 16 at the trailing edge of the drive signal a. This causes a resistor 15 to consume the electric energy ascribable to the residual charge of the PZ stack 11 by transforming the electric energy to thermal energy. In the drive circuit of FIG. 1, diodes 18 and 19 are respectively associated with the switching circuits 14 and 16 for bypassing a reverse current.

A problem with the prior art drive circuit discussed above is that the resistor 15 has to consume the residual charge by transforming it to thermal energy at the cost of time and energy. Further, a winding having a large inductance and, therefore, a large size is needed in order that the PZ stack 11 may be charged to a sufficient voltage by the resonance current.

Figure 3:
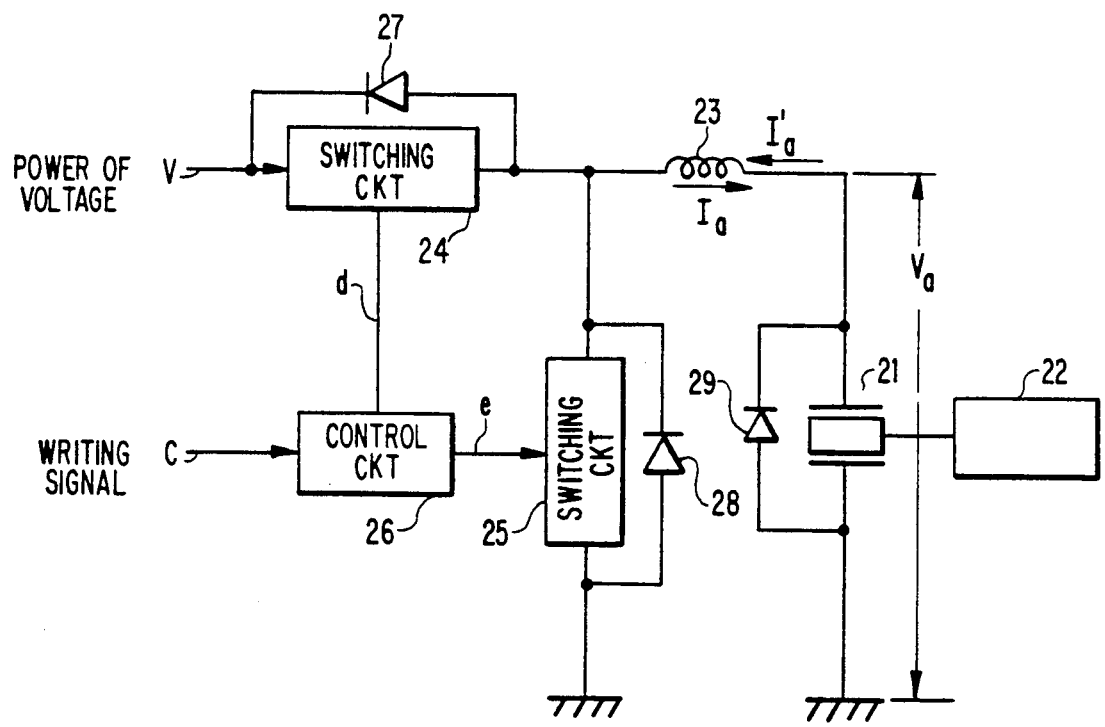
FIG. 3 is a schematic block diagram of a PZ stack drive circuit embodying the present invention.

Referring to FIG. 3, a PZ stack drive circuit embodying the present invention is shown. In this embodiment, a PZ stack 21 and a reciprocating mechanical object 22 are mechanically interconnected and are respectively identical with the PZ stack 11 and the object 12 of FIG. 1. A winding 23 is connected in series with the PZ stack 21. A first and a second switching circuit 24 and 25, respectively, are connected to the winding 23. Diodes 27 and 28 are respectively connected in parallel with the switching circuits 24 and 25 for bypassing a reverse current, and diode 29 is connected in parallel with the PZ stack 21. An excitation voltage V is constantly applied to the switching circuit 24. A control circuit 26 controls the switching operations of the switching circuits 24 and 25 to prevent a charge from remaining in the PZ stack 21 after the print-out of a dot. The control circuit 26, therefore, clearly distinguishes the prevent invention over the prior art.

Figure 4:
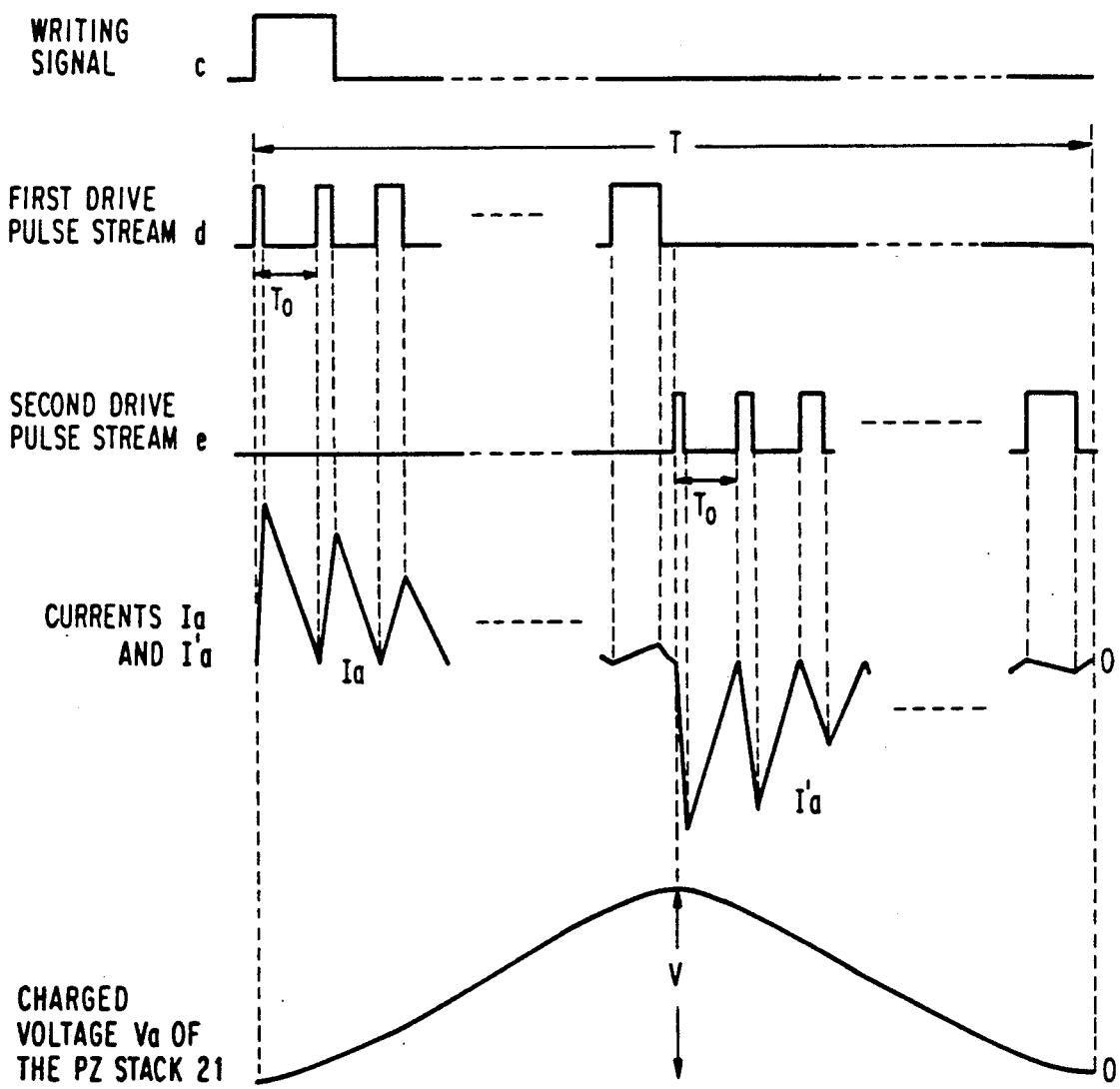
FIG. 4 is a timing chart demonstrating the operation of the drive circuit of FIG. 3.

Referring to FIG. 4 together with FIG. 3, in response to a writing signal C, the control circuit 26 generates a first switch drive pulse stream d for turning on the switching circuit 24 intermittently and then a second switch drive pulse stream e for turning on the switching circuit 25 intermittently. During a period of time T in which the two drive pulse sequences d and e appear in sequence, the charged voltage $V_a$ of the PZ stack 21 varies along a sinusoidal waveform so that the PZ stack 21 generates a dimensional strain proportional to the voltage $V_a$. The drive pulse streams d and e individually have a period $T_O$ which is sufficiently shorter than the period T of the strains of the PZ stack 21. In each of the drive pulse streams d and e, the pulse width is smallest at the first pulse and sequentially increased with the lapse of time.

When the switching circuit 24 is turned on by the first drive pulse stream d, the excitation voltage V is applied to the series connection of winding 23 and PZ stack 21, and the charging current $I_a$ flows into the PZ stack 21. Assuming that a variable representative of the width of each pulse of the pulse stream d is t, the increased charged voltage $\Delta V_{a1}$ during the pulse width t is expressed as:

$$\Delta V_{a1} = (V - V_{a1})\cos \frac{t}{\sqrt{LC}} \quad (1)$$

where $V_{a1}$ is the charged voltage of the PZ stack 21 immediately before the turn-on of the switching circuit 24, L is the inductance of the winding 23, and C is the capacitance of the PZ stack 21.

On the other hand, during the interval between the trailing edge of a pulse having a width t and the leading edge of the next pulse, i.e., $(T_o-t)$, the switching circuit 24 is turned off so that the PZ stack 21, diode 28 and winding 23 forms a closed current path. As a result, the electromagnetic energy having been stored in the winding 23 is transferred to the PZ stack 21 to increase the charged voltage $V_a$. The increased charged voltage $\Delta V_{a2}$ during the interval is as follows:

$$\Delta V_{a2} = V_{a2} - V_{a2} \cdot \cos \frac{T_o - t}{\sqrt{LC}} \quad (2)$$

where $V_{a2}$ is the charged voltage of the PZ stack 21 immediately before the turn-off of the switching circuit 24.

Therefore, the charged voltage $V_a$ sequentially increases every time the switching circuit 24 is turned on and off by the pulses of the first drive pulse stream d, according to the equations (1) and (2). The dimensional strain of the PZ stack 21 also sequentially increases in proportion to the charging voltage $V_a$.

As soon as the charged voltage $V_a$ reaches the excitation voltage V, the first drive pulse stream d disappears, and the second drive pulse stream e appears instead. When the switching circuit 25 is turned on by the drive pulse stream e, the discharging current $I'_a$ flows from the PZ stack 21 to ground via the winding 23. Assuming that a variable representative of the width of a pulse of the pulse stream e is t', the charged voltage $V_a$ decreases by $\Delta V_{a3}$ for every pulse, which is expressed as:

$$\Delta V_{a3} = V_{a3} - V_{a3} \cdot \cos \frac{t'}{\sqrt{LC}} \quad (3)$$

where $V_{a3}$ is the charged voltage of the PZ stack 21 immediately before the turn-on of the switching circuit 25.

During the interval between the trailing edge of a pulse having a width t' and the leading edge of the next pulse, i.e., $(T_o - t')$, the switching circuit 25 is turned off so that the diode 29, winding 23 and diode 27 form a current path. In this condition, the electromagnetic energy having been stored in the winding 23 is supplied back to a power supply through the diode 27 to lower the charged voltage $V_a$. The decreased charging voltage $\Delta V_{a4}$ during the interval is expressed as:

$$\Delta V_{a4} = V_{a4} - V_{a4} \cdot \cos \frac{T_o - t'}{\sqrt{LC}} \quad (4)$$

where $V_{a4}$ is the charged voltage of the PZ stack 21 immediately before the turn-off of the switching circuit 25.

The charged voltage $V_a$, therefore, sequentially decreases every time the switching circuit 25 is turned on and off by the pulses of the second drive pulse stream, according to the equations (3) and (4). The dimensional strain of the PZ stack 21 also decreases in proportion to the decreased charged voltage. As the period of time T expires, the charged voltage $V_a$ reaches zero and, hence, the strain disappears.

In the illustrative embodiment, the inductance L of the winding 23 may be determined irrespective of the proper oscillation frequency of the stack because no use is made of resonance. The use of the higher frequencies of the drive pulse streams d and e helps to reduce the required inductance L. Conversely, when the frequencies of the drive pulse streams d and e are low, the inductance L increases because greater energy has to be fed from the coil 23 to the PZ stack 21. Since the illustrative embodiment causes the charge and discharge of the PZ stack 21 to occur intermittently at short periods, a stable charging current is achievable and, after the termination of the drive pulse streams d and e, no charge remains in the PZ stack 21. This makes it needless to release energy wastefully and thereby saves time. Information can, therefore, be printed out efficiently and at high speed.

Figure 5:
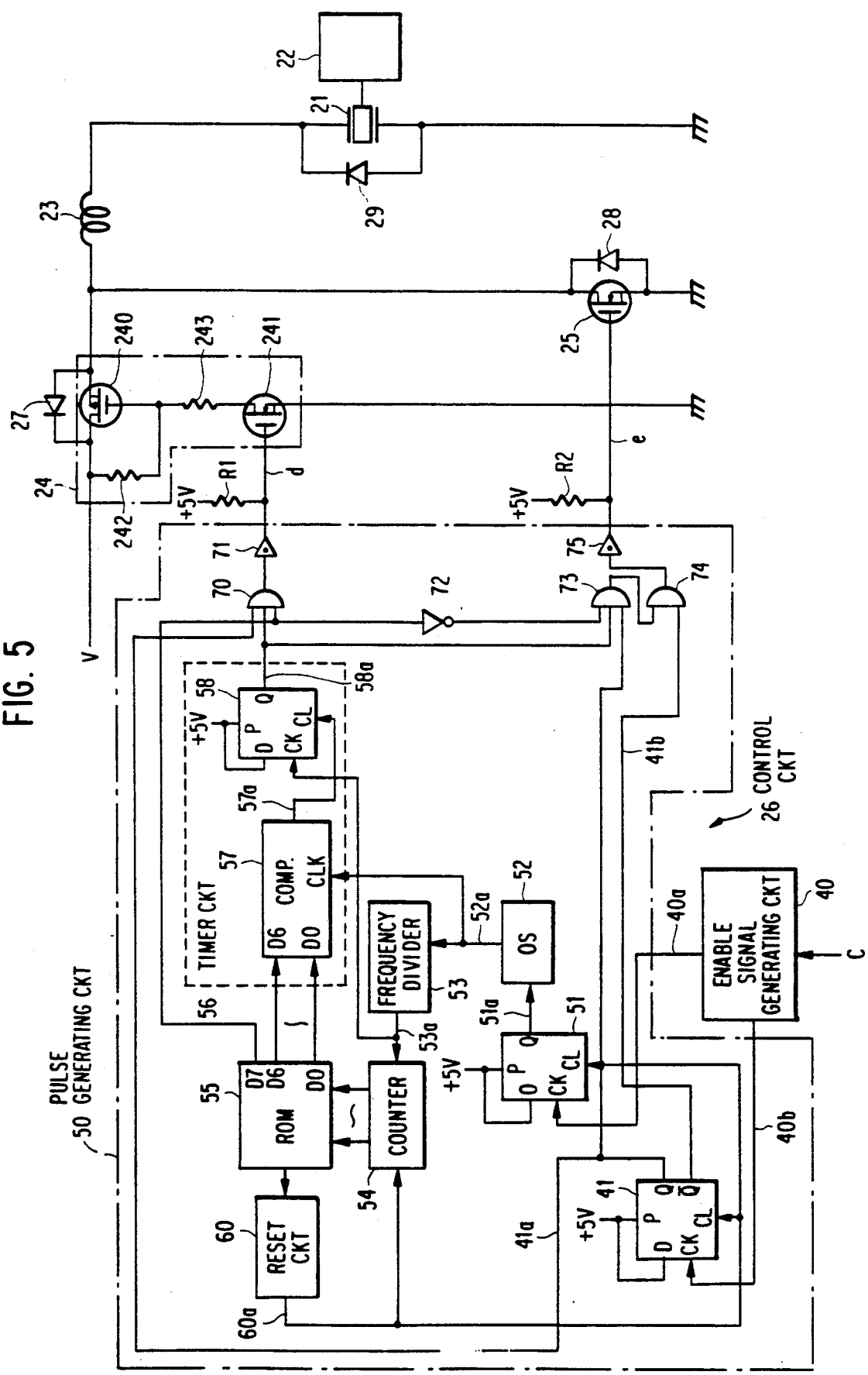
FIG. 5 is a schematic block diagram showing a more specific construction of the drive circuit shown in FIG. 3.
Figure 6:
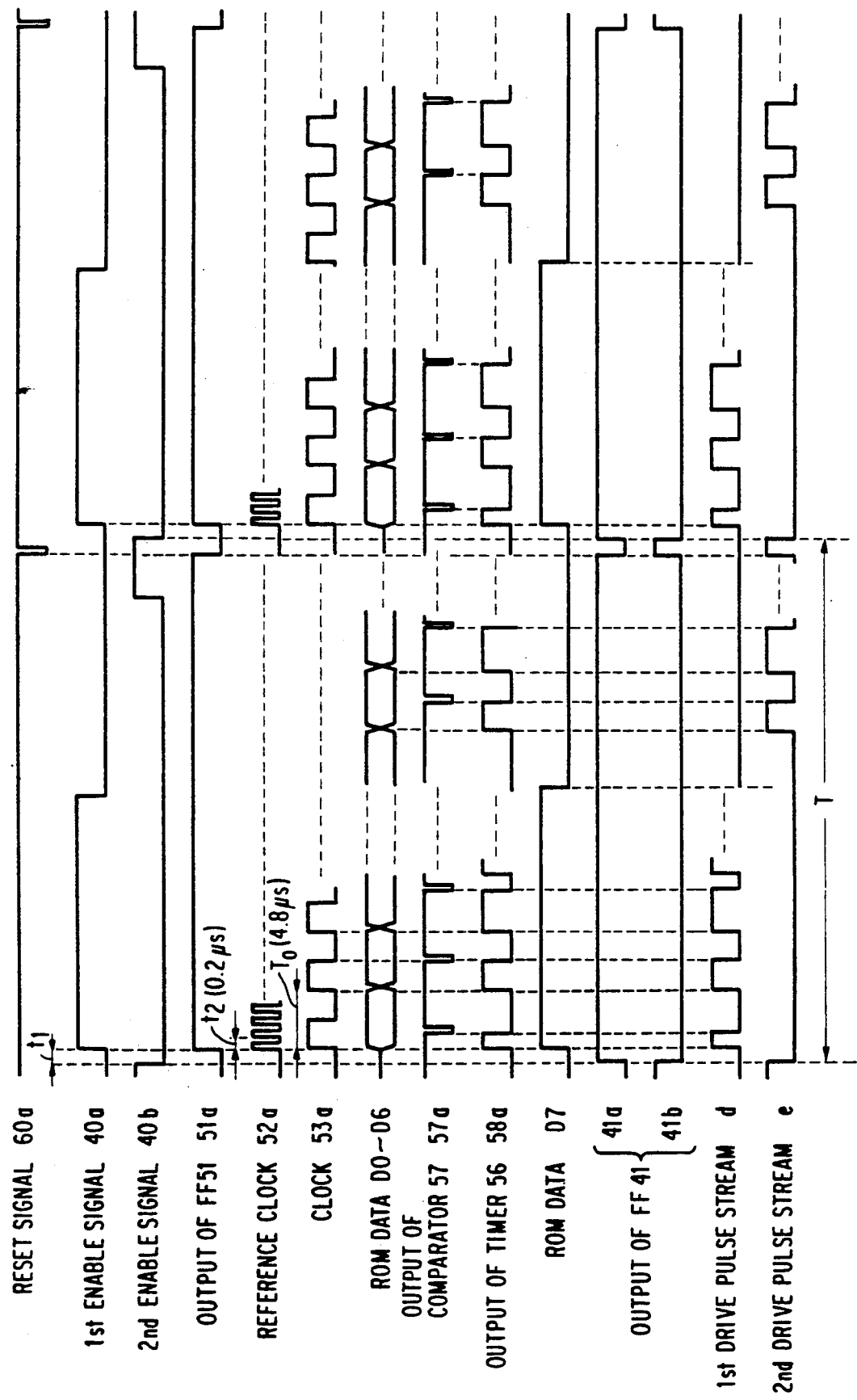
FIG. 6 is a timing chart representative of the operation of the drive circuit shown in FIG. 5.

FIG. 5 shows a specific construction of the drive circuit shown in FIG. 3, while FIG. 6 demonstrates the operation of the circuitry of FIG. 5. As shown in FIG. 5, the switching circuit 24 has MOS (Metal Oxide Semiconductor) transistors 240 and 241, and resistors 242 and 243. The MOS transistor 241 has a gate to which the first drive pulse stream d is applied. When the transistor 241 is turned on, a voltage divided by the resistors 242 and 243 is applied to the gate of the transistor 240 to render the transistor 240 conductive. The switching circuit 25 is implemented by a MOS transistor and is turned on intermittently by the second drive pulse stream e.

The control circuit 26 has an enable signal generating circuit 40 for generating a first and a second enable signal 40a and 40b, and a pulse generating circuit 50 for generating the pulse streams d and e in response to the enable signals as will be described. As shown in FIG. 6, the first enable signal 40a appears a period of time $t_1$ later than the second enable signal 40b and enables the pulse generating circuit 50 at its leading edge.

The pulse generating circuit 50 is made up of an oscillator 52 for generating a high-frequency reference clock signal, a frequency divider 53, an address counter 54, a ROM 55 storing pulse width data associated with the pulses of the drive pulse streams d and e, a timer circuit 56 for generating a pulse signal matching the pulse width data from the ROM 55, and gates 70, 71, 72, 73, 74 and 75 for outputting the pulse streams d and e by separating the output of the timer circuit 56. In operation, an output signal 51a of a D flip-flop 51 is turned to a high level by the leading edge of the first enable signal 40a. Then, the oscillator 52 generates a reference clock signal 52a having a frequency of 5 megahertz (period of 0.2 microsecond) and continuously generates it until the D flip-flop 51 has been cleared. The frequency divider 53 divides the frequency of the reference clock signal 52 twenty-four consecutive times to produce a clock signal 53a whose frequency is 208 kilohertz. The period of the clock 53a is equal to the repetition period $T_o$ of the pulse streams d and e shown in FIG. 4 and is 4.8 microseconds. The address counter 54 counts the clock signal 53a while outputting the counts as hexadecimal addresses for accessing the ROM 55. More specifically, the address counter 54 outputs address 00H and successive addresses in this sequence. When a resetting circuit 60 detects data written in the last address, the address counter 54 is reset. The ROM 55 stores hexadecimal 8-bit data in each address which is representative of a pulse width of either one of the pulse streams d and e. Among the eight bits, lower seven bits D0 to D6 are representative of a pulse width and are fed to the timer circuit 56, while the uppermost bit D7 is used to distinguish the pulse streams d and e from each other. Specifically, the uppermost bit D7 is representative of pulse stream switching data which is in a high level when the data D0 to D6 are the pulse width data of the pulse stream d and in a low level when they are the pulse width data of the pulse stream e.

The sole lists on an address basis the hexadecimal pulse width data (ROM DATA), an elasped time since the generation of the address 00H, and a pulse width matching the pulse width data which are loaded in the ROM 55. The pulse widths are the adequate values determined on the assumption that the inductance L of the winding 23 is 150 microhenries, the capacitance of the PZ stack 21 is 0.28 microfarads, and the excitation voltage is 170 volts. As shown, the ROM 55 stores data 00H in address 00H, data representative of pulse widths of the pulse stream d in addresses 01H to 1EH, and data representative of pulse widths of the pulse stream e in addresses 20H to 3AH. While data 00H is written in the intermediate address 1FH, this data serves as dummy data for preventing the switching circuit 24 and 25 from being turned on at the same time. When data 7FH is read out by the last address 3BH after consecutive data 00H to 10H, the reset circuit 60 produces a reset signal 60a by deciding that the data 7FH is the last data. The reset circuit 60a resets the D flip-flops 41 and 51 and address counter 55.

TABLE

| ADDRESS | ROM DATA | ELAPSED TIME (μS) | PULSE WIDTH (μS) |
|---|---|---|---|
| 00 H | 00 H | 0.0 | |
| 01 H | 80 H | 4.8 | 0.00 |
| 02 H | 80 H | 9.6 | 0.00 |
| 03 H | 80 H | 14.2 | 0.00 |
| 04 H | 81 H | 19.2 | 0.20 |
| 05 H | 81 H | 24.0 | 0.20 |
| 06 H | 82 H | 28.8 | 0.40 |
| 07 H | 82 H | 33.6 | 0.40 |
| 08 H | 83 H | 38.4 | 0.60 |
| 09 H | 83 H | 43.2 | 0.60 |
| 0A H | 84 H | 48.0 | 0.80 |
| 0B H | 85 H | 52.8 | 1.00 |
| 0C H | 86 H | 57.6 | 1.20 |
| 0D H | 86 H | 62.4 | 1.20 |
| 0E H | 87 H | 67.2 | 1.40 |
| 0F H | 88 H | 72.0 | 1.60 |
| 10 H | 89 H | 76.8 | 1.80 |
| 11 H | 8A H | 81.6 | 2.00 |
| 12 H | 8B H | 86.4 | 2.20 |
| 13 H | 8B H | 91.2 | 2.20 |
| 14 H | 8C H | 96.0 | 2.40 |
| 15 H | 8D H | 100.8 | 2.60 |
| 16 H | 8E H | 105.6 | 2.80 |
| 17 H | 8F H | 110.4 | 3.00 |
| 18 H | 90 H | 115.2 | 3.20 |
| 19 H | 90 H | 120.0 | 3.20 |
| 1A H | 91 H | 125.8 | 3.40 |
| 1B H | 91 H | 129.6 | 3.40 |
| 1C H | 91 H | 134.4 | 3.40 |
| 1D H | 8F H | 139.2 | 3.00 |
| 1E H | 8C H | 144.0 | 2.40 |
| 1F H | 00 H | 148.8 | 0.00 |
| 20 H | 03 H | 153.6 | 0.60 |
| 21 H | 05 H | 158.4 | 1.00 |
| 22 H | 06 H | 163.2 | 1.20 |
| 23 H | 06 H | 168.0 | 1.20 |
| 24 H | 07 H | 172.8 | 1.40 |
| 25 H | 08 H | 177.6 | 1.60 |
| 26 H | 08 H | 182.4 | 1.60 |
| 27 H | 09 H | 187.2 | 1.80 |
| 28 H | 0A H | 192.0 | 2.00 |
| 29 H | 0A H | 196.8 | 2.00 |
| 2A H | 0B H | 200.6 | 2.20 |
| 2B H | 0B H | 206.4 | 2.20 |
| 2C H | 0C H | 211.2 | 2.40 |
| 2D H | 0C H | 216.0 | 2.40 |
| 2E H | 0D H | 220.8 | 2.60 |
| 2F H | 0D H | 225.6 | 2.60 |
| 30 H | 0E H | 230.4 | 2.80 |
| 31 H | 0E H | 235.2 | 2.80 |
| 32 H | 0F H | 240.0 | 3.00 |
| 33 H | 0F H | 244.8 | 3.00 |
| 34 H | 10 H | 249.6 | 3.20 |
| 35 H | 10 H | 254.4 | 3.20 |
| 36 H | 10 H | 259.2 | 3.20 |
| 37 H | 11 H | 264.0 | 3.40 |
| 38 H | 11 H | 268.8 | 3.40 |
| 39 H | 11 H | 273.6 | 3.40 |
| 3A H | 10 H | 278.4 | 3.20 |
| 3B H | 7F H | 283.2 | |

The timer circuit 56 has a comparator 57 and a flip-flop 58 and generates a pulse stream 58a having a pulse width which is represented by the output data D0 to D6 of the ROM 55. A counter is built in the comparator 57 for counting the reference clock pulse 52a from the instant when the data D0 to D6 appear. The comparator 57 generates a low-level pulse signal 57a when the counter thereof coincides with the data D0 to D6. The flip-flop 58 produces a pulse stream which is turned to a low level by a pulse signal 57a in synchronism with the clock signal 53a which is fed thereto from the frequency divider 53. The pulse stream 58a includes the pulse streams d and e. The pulse stream d is selected by the AND gate 70 and routed through a buffer 71 to the transistor 241, while the pulse stream e is selected by the AND gate 73 and OR gate 74 and fed to the transistor 25 via a buffer 75. The AND gate 70 ANDs the output signal 58a, pulse stream switching data D7, and output signal 41a of the flip-flop 41. The AND gate 73 ANDs the output signal 58a, output of the NOT gate 72, and output signal 41a. Further the OR gate 74 ORs the output of the AND gate 73 and the inverted output signal 41b.

As stated above, the control circuit 26 generates the pulse streams d and e during the interval between the time when the first enable signal 40a rises in response to the writing signal C and the time when the reset signal 60 produces a reset signal 60a.

In summary, it will be seen that the present invention provides a PZ stack drive circuit which generates a dimensional strain varying along a sinusoidal waveform in a PZ stack by applying an excitation voltage intermittently to the series connection of the PZ stack and a winding via a first switching circuit and then releasing the charge of the PZ stack intermittently via a second switching circuit. The drive circuit, therefore, insures efficient and stable charging and discharging of the PZ stack and eliminates wasteful consumption of energy. The drive circuit is miniaturized because the required inductance of the winding is reduced. It is noteworthy that the control circuit which is a characteristic feature of the present invention can be readily implemented as an LSI and, therefore, does not increase the circuit scale at all.

What is claimed is:

1. A drive circuit for driving a piezoelectric (PZ) stack which is connected to a reciprocating mechanical object, generates a dimensional strain in response to an excitation voltage, and imparts said strain to said mechanical object to cause said mechanical object to have a reciprocating motion, said drive circuit comprising:

a winding connected in series with said PZ stack;

first switching means for switching the supply of the excitation voltage intermittently and for feeding it to a series connection of said winding and said PZ stack in response to a first drive pulse stream and having a pulse width which varies with time;

second switching means for switching the series connection of said winding and a terminal of said PZ stack to the ground intermittently and for discharging a charge stored in the PZ stack via said winding in response to a second drive pulse stream which appears immediately after said first drive pulse stream and has a pulse width which varies with time; and control means for controlling said first and second switching means by generating said first and second drive pulse streams such that a charged voltage of the PZ stack returns to an initial state in a repetitior period of said first and second drive pulse streams.

2. A drive circuit as claimed in claim 1, further comprising:

first bypassing means connected in parallel with said first switching means for bypassing a current, having a polarity opposite that of a charging current, appearing on an output of said first switching means and being applied in a direction opposite that of said charging current; and second bypassing means connected in parallel with said second switching means for bypassing a current, having a polarity opposite that of a discharging current, appearing on an output of said second switching means and being applied in a direction opposite that of said discharging current.

3. A drive circuit as claimed in claim 2, wherein said control means comprises:

a circuit for generating an enable signal in response to a writing signal; and a pulse generating circuit for generating said first and second drive pulse streams in response to said enable signal;

said pulse generating circuit comprising:

an oscillator for generating a high-frequency reference clock signal;

a frequency divider for dividing a frequency of said reference clock signal;

a counter for counting a clock signal outputted by said frequency divider;

a storage circuit for storing in addresses represented by outputs of said counter data which are associated with widths of pulses of said first and second drive pulse streams; and a timer circuit for generating said first and second drive pulse streams in response to output data of said storage circuit.

4. A drive circuit for driving a piezoelectric (PZ) stack which is connected to a reciprocating mechanical object, generates a dimensional strain in response to an excitation voltage, and imparts said strain to said mechanical object to cause said mechanical object to have a reciprocating motion, said drive circuit comprising:

a winding connected in series with said PZ stack;

drive pulse generating means coupled to a series connection of said winding and said PZ stack for generating for a first period of time a first drive pulse stream having a pulse width which gradually increases with time;

short circuit means coupled to a terminal connecting said winding and said drive pulse generating means for providing a short circuit of the series connection of said winding and said PZ stack intermittently in response to a control pulse stream; and control pulse generating means coupled to said short circuit means for generating for a second period of time the control pulse stream having a pulse width which gradually increases with time, wherein said reciprocating motion is completed in a cycle of said first and second periods of time.

5. A drive circuit as claimed in claim 2, further comprising third bypassing means connected in parallel with said PZ stack for bypassing a current, having a polarity opposite that of said charging current appearing on an output of said PZ stack and being applied in a direction opposite to that of said charging current.

6. A drive circuit as claimed in claim 3, wherein said clock signal has a period equal to a repetition period of said first and second pulse streams.

7. A drive circuit for driving a piezoelectric (PZ) stack generates a dimensional strain in response to an excitation voltage, said drive circuit comprising:

a winding connected in series with said PZ stack;

first switching means for switching the supply of the excitation voltage intermittently and for feeding it to a series connection of said winding and said PZ stack in response to a first drive pulse stream and having a pulse width which varies with time;

second switching means for switching the series connection of said winding and a terminal of said PZ stack to the ground intermittently and for discharging a charge stored in the PZ stack via said winding in response to a second drive pulse stream which appears immediately after said first drive pulse stream and has a pulse width which varies with time; and control means for controlling said first and second switching means by generating said first and second drive pulse streams such that a charged voltage of the PZ stack returns to an initial state in a repetition period of said first and second drive pulse streams.

8. A drive circuit as claimed in claim 7, further comprising:

first bypassing means connected in parallel with said first switching means for bypassing a current, having a polarity opposite that of a charging current, appearing on an output of said first switching means and being applied in a direction opposite that of said charging current; and second bypassing means connected in parallel with said second switching means for bypassing a current, having a polarity opposite that of a discharging current appearing on an output of said second switching means and being applied in a direction opposite that of said discharging current.

9. A drive circuit as claimed in claim 8, wherein said control means comprises:

a circuit for generating an enable signal in response to a writing signal; and a pulse generating circuit for generating said first and second drive pulse streams in response to said enable signal;

said pulse generating circuit comprising:

an oscillator for generating a high-frequency reference clock signal;

a frequency divider for dividing a frequency of said reference clock signal;

a counter for counting a clock signal outputted by said frequency divider;

a storage circuit for storing in addresses represented by outputs of said counter data which are associated with widths of pulses of said first and second drive pulse streams; and a timer circuit for generating said first and second drive pulse streams in response to output data of said storage circuit.

10. A drive circuit as claimed in claim 7, further comprising third bypassing means connected in parallel with said PZ stack for bypassing a current having a polarity opposite that of said charging current, appearing on an output of said PZ stack and being applied in a direction opposite to that of said charging current.

11. A drive circuit as claimed in claim 9, wherein said clock signal has a period equal to a repetition period of said first and second pulse streams.

12. A drive circuit for driving a piezoelectric (PZ) stack, generates a dimensional strain in response to an excitation voltage, said drive circuit comprising:

a winding connected in series with said PZ stack;

drive pulse generating means coupled to a series connection of said winding and said PZ stack for generating for a first period of time a first drive pulse stream having a pulse width which gradually increases with time;

short circuit means coupled to a terminal connecting said winding and said drive pulse generating means for providing a short circuit of the series connection of said winding and said PZ stack intermittently in response to a control pulse stream; and control pulse generating means coupled to said short circuit means for generating for a second period of time the control pulse stream having a pulse width which gradually increases with time, wherein one operation for generating and removing said dimensional strain is completed in a cycle of said first and second periods of time.

* * * * *